W. R. HUDSON.
STEERING DEVICE.
APPLICATION FILED JAN. 26, 1917.
1,396,755.
Patented Nov. 15, 1921.
2 SHEETS—SHEET 1.
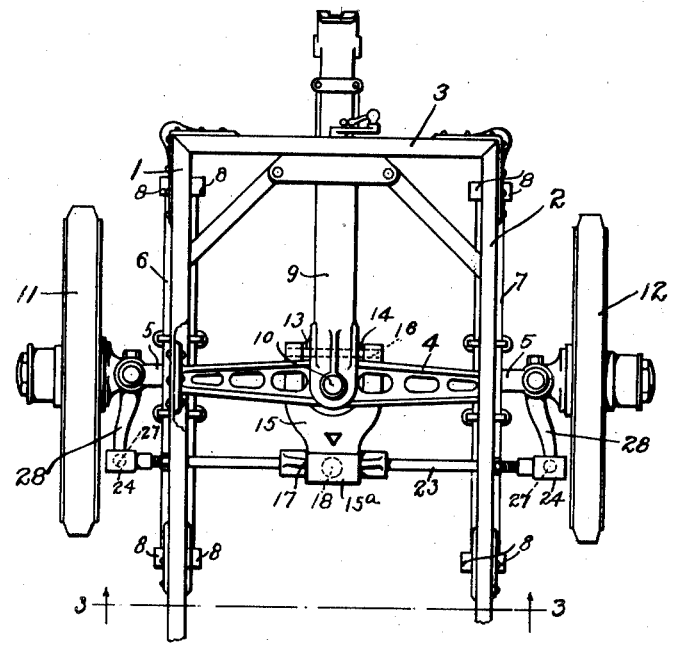
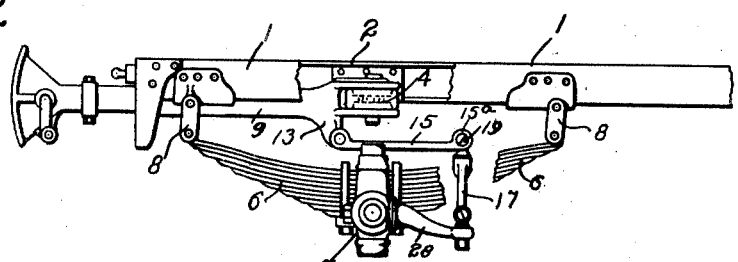
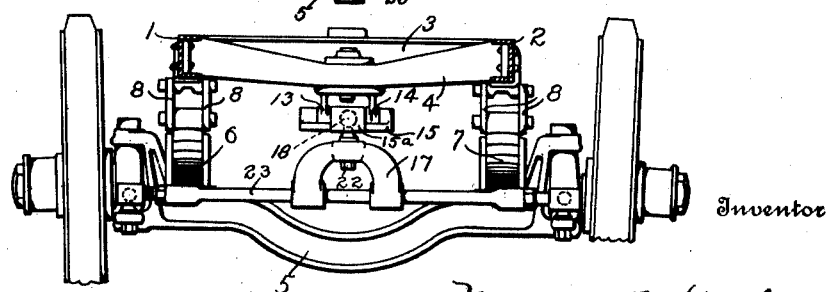
Inventor
Warren R. Hudson
By
Staley & Bowman
Attorneys W. R. HUDSON.
STEERING DEVICE.
APPLICATION FILED JAN. 26, 1917.
1,396,755.
Patented Nov. 15, 1921.
2 SHEETS—SHEET 2.
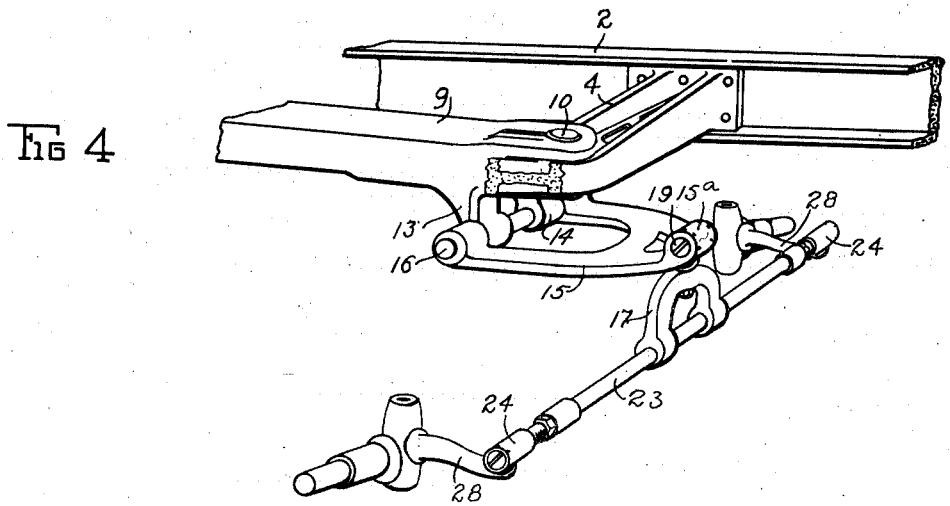
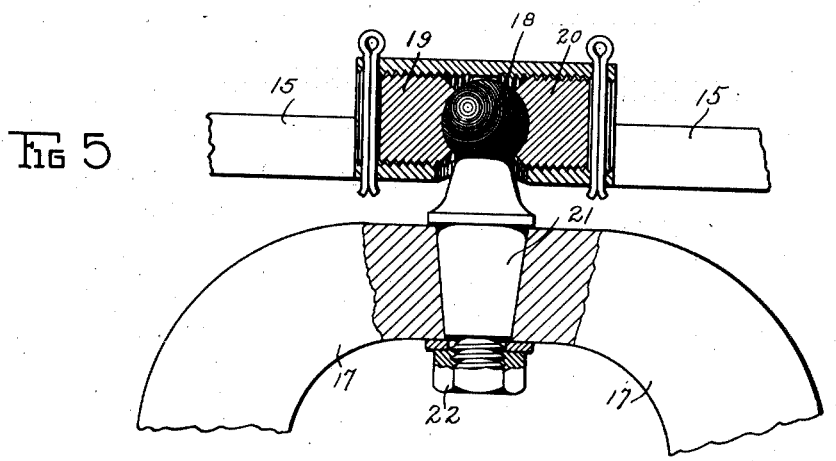
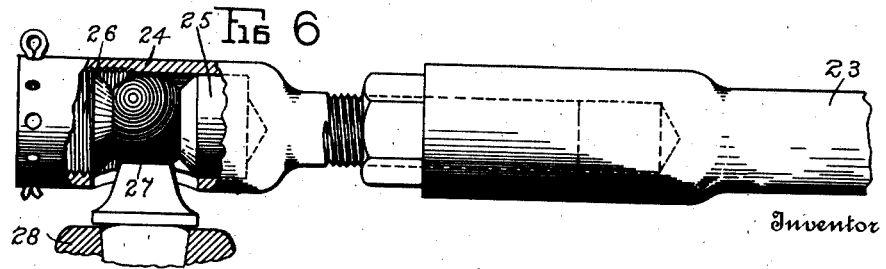
Inventor
Warren R. Hudson
By
Staley & Bowman
Attorneys

UNITED STATES PATENT OFFICE.

WARREN R. HUDSON, OF TROY, OHIO, ASSIGNOR TO THE TROY WAGON WORKS COMPANY, OF TROY, OHIO, A CORPORATION OF OHIO.

STEERING DEVICE.

1,396,755.      Specification of Letters Patent.      Patented Nov. 15, 1921.

Application filed January 26, 1917. Serial No. 144,674.

*To all whom it may concern:*

Be it known that I, WARREN R. HUDSON, a citizen of the United States, residing at Troy, in the county of Miami and State of Ohio, have invented certain new and useful Improvements in Steering Devices, of which the following is a specification.

This invention relates to improvements in steering devices, the devices being more particularly adapted for trailers for motor trucks or other road engines.

An object of the invention is to improve the construction set forth in my application Ser. No. 59,128 filed May 1st, 1915, by providing an improved arrangement of connections between the draft bar and carrying wheels.

The arrangement set forth in my former application, while effective and one which has been commercially successful, was objectionable in the respect that relative movement between the frame of the vehicle and the axle or carrying wheels would tend to throw the connections between the draft rod and the steering knuckles out of their true working position which had a tendency to throw the wheels out of proper alinement. The specific object of my present improvement is to overcome this difficulty by providing such a connection between the draft bar and the wheels as will not affect the wheels during relative movement of the body with respect to the axle due to uneven travel or otherwise.

In the accompanying drawings:—

Figure 1 is a top plan view of so much of a trailer as is necessary to illustrate my improvements.

Fig. 2 is a side elevation of a portion of same, a part of the near side of the frame and spring being broken away.

Fig. 3 is a section on the line 3—3 of Fig. 1.

Fig. 4 is a perspective view of some of the parts shown in the preceding views.

Figs. 5 and 6 are detail sections.

Referring to the drawings, 1 and 2 represent respectively the side rails of the main frame, 3 one of the ends thereof and 4 an intermediate cross-bar.

The frame is supported from the axle 5 by the springs 6 and 7 which are connected to the frame by the shackles 8. The draft bar 9 is pivotally connected to the cross-bar 4 by the pin 10 and provision is made for connecting this draft bar to the carrying wheels 11 and 12 in the following manner.

Pivotally connected to downwardly extending ears 13 and 14 on the draft bar 9 near the pivotal point thereof is a yoke-shaped member 15; a transversely-extending pin 16 being employed for the purpose so that the yoke 15 may swing in a vertical direction but normally lies in a substantially horizontal position. Connected to the rear end of this yoke 15 by a universal connection is a second yoke member 17, the connection being made in the manner shown in detail in Fig. 5 in which it will be seen that the yoke 17 is provided with a ball 18 arranged in a socket in the yoke 15, the socket consisting of the adjustable plugs 19 and 20 threaded in the housing 15$^a$ on the rear end of the yoke 15. The ball 18 is formed on the tapered plug 21 fitted in the tapered opening in the yoke 17 and firmly held therein by the nut 22 threaded on the lower end of the plug 21. The ball 18 extends upwardly through the bottom of the housing 15$^a$ so that the yoke 17 stands in a substantially vertical position and may therefore not only have a swiveling movement with respect to the yoke 15 but may also swing in a fore and aft direction relative the frame and axle.

Secured fast to the lower end of the yoke 17 is a rod 23, the respective ends of which are provided with adjustable housings 24 having therein plugs 25 and 26 to provide sockets for balls 27 on the outer ends of the arms 28 of the steering knuckles; the plugs 26 being threaded in the housings so as to be adjustable therein.

By this construction it will be seen that any movement of the frame relative to the axle and wheels will not affect the steering connections by elongating or shortening the same, since the pivotal connection between the yoke 15 and the draft bar 9 allows for the vertical movement of the frame, while the universal connection between the respective yoke members allows for torsional movement also fore and aft swinging movements; the single rigid connection between the steering arms of the wheels, consisting of the rod 23 and housings 24, serving to keep the wheels in their proper alinement.

It will be observed that, by reason of the mechanism and the coördination of parts set forth herein, I obtain an organization in which there is a rod-connection between the steering arms, a draw-bar which is subjected to up and down or vertical movements, and an intermediate device pivoted to and carried by the draw-bar and pivoted to the rod-connection.

Having thus described my invention, I claim:—

1. In a vehicle of the character described, a main frame, an axle, carrying wheels pivotally connected with said axle, springs for supporting said frame from said axle, a draft bar pivotally connected to said frame, a transversely extending steering rod pivotally connected with said wheels, and a pair of connecting members between said draft bar and said rod swivelly connected together, one of said connecting members being pivotally connected with said draft bar by a transversely arranged pivot.

2. In a vehicle of the character described, a main frame, an axle, carrying wheels pivotally connected with said axle, springs for supporting said frame from said axle and wheels, a draft bar pivotally connected to said frame, steering arms connected with said wheels, a transversely extending rod swivelly connected with said arms, two connecting members between said bar and rod, one of said connecting members being pivotally connected to said bar by a transversely arranged pivot and lying in a plane substantially parallel to said bar, the other connecting member being connected with said rod and lying in a plane substantially at right angles thereto, and a swiveled connection between the free ends of said connecting members.

3. In a vehicle of the character described, a main frame, an axle, carrying wheels pivotally connected with said axle, springs for supporting said frame from said axle and wheels, a draft bar pivotally connected to said frame, steering arms connected with said wheels, a transversely extending rod connected with said arms by ball and socket joints, two connecting members, one of said connecting members being pivotally connected with said bar by a transversely arranged pivot and the other connecting member having a connection with said rod, and a ball and socket connection between the free ends of said connecting members.

4. A truck having, in combination, an axle provided with steering knuckles and wheels thereon, a body frame mounted to have movement up and down with relation to the axle, a draw-bar pivotally mounted on the body frame, and a connection between the draw-bar and said steering knuckles comprising two devices joined by a universal connection and both mounted to rock only upon horizontal axes extending transversely to the body frame, one of said devices being mounted on the draw-bar and the other device being directly connected to the steering knuckles by means which rigidly ties said steering knuckles together.

5. A truck having, in combination, a body frame and an axle connected by springs to have a relative motion up and down, wheels on said axle provided with steering knuckles, a draw-bar pivotally mounted on the body frame, and a steering connection between said draw-bar and said knuckles comprising two devices joined by a universal connection, said devices being mounted to rock only on horizontal axes extending approximately parallel with said axle, one device lying horizontally and arranged to rock up and down and the other device being vertically disposed and arranged to rock forward and back, one of said devices being mounted on the draw-bar and the other device being directly connected to said steering knuckles by means which rigidly ties the knuckles together.

6. A truck having, in combination, a single tie member directly connected to the steering knuckles for the wheels, a body frame mounted for movement up and down with relation to the wheels, a draw-bar pivoted to the body frame, a member rising in a central position from said tie member, and another member having a ball-and-socket connection with the first member and connected to the draw-bar to rock up and down.

7. A truck having, in combination, an axle provided with steering knuckles and wheels thereon, a body frame mounted to have movement up and down with relation to said axle, a draw-bar pivotally mounted on the body frame to swing on a vertical axis, a device pivoted on the draw-bar to rock up and down on a horizontal axis only, and means connecting said steering knuckles to said device whereby the relative up-and-down movement between the frame and the axle will not affect the position of said steering knuckles.

8. In a vehicle of the character described, a spring supported frame, a draft-bar, means pivotally connecting the draft-bar to said frame, an axle, steering axles pivoted to said axle, wheels rotatably mounted upon the steering axles, means connecting said steering axles for joint movement, connections interposed between the draft-bar and said last mentioned means and including a plurality of members, and also including means operating independently of the first mentioned means for pivotally connecting one member of said device to said draft-bar, means pivotally connecting said members together, and means connecting the other members of the device to the second mentioned means.

9. In a vehicle of the character described, an axle, wheels supporting the axle, steering knuckles having steering arms with a rod connecting two of the arms to keep the wheels parallel, a frame, springs for supporting the frame above the axle thereby allowing up and down motion of the frame relative to the axle, a draw bar pivoted on the frame for turning in a horizontal plane, and means for transmitting the horizontal motion of the draw bar on its pivot to a knuckle arm, said means being provided with fixed pivotal connections on the draw bar, the steering arms and at an intermediate point between the two to free the knuckle arm of any up or down motion of the draw bar substantially as described In testimony whereof I have hereunto set my hand this third day of January, 1917.

WARREN R. HUDSON.

Witnesses:
L. H. SHIPMAN,
FLORENCE L. DE FREES.